(12) United States Patent
Rehm (10) Patent No.: US 7,980,565 B2
(45) Date of Patent: Jul. 19, 2011

(54) DIAPHRAGM CHUCK

(75) Inventor: Fritz Rehm, Oberteuringen (DE)

(73) Assignee: SMW-Autoblok Spannsysteme GmbH, Meckenbeuren (DE)

( * ) Notice: Subject to any disclaimer, the term of this patent is extended or adjusted under 35 U.S.C. 154(b) by 1168 days.

(21) Appl. No.: 11/713,981

(22) Filed: Mar. 5, 2007

(65) Prior Publication Data
US 2007/0235954 A1  Oct. 11, 2007

(30) Foreign Application Priority Data

Mar. 23, 2006 (EP) ..................................... 06005818

(51) Int. Cl.
*B23B 31/32* (2006.01)
(52) U.S. Cl. .......................... 279/139; 279/124; 279/130
(58) Field of Classification Search .................. 279/2.05, 279/4.05, 124, 130, 139, 152; *B23B 31/32*
See application file for complete search history.

(56) References Cited

U.S. PATENT DOCUMENTS

| | | | | |
|---|---|---|---|---|
| 2,719,721 A | | 10/1955 | Grobey | |
| 3,190,664 A | * | 6/1965 | Toth et al. | 279/4.05 |
| 3,344,695 A | * | 10/1967 | Hohwart | 82/165 |
| 4,067,586 A | * | 1/1978 | Morawski | 279/139 |
| 4,645,219 A | * | 2/1987 | Link et al. | 279/130 |
| 6,145,850 A | | 11/2000 | Rehm | |
| 6,880,831 B2 | * | 4/2005 | Taglang | 279/4.05 |
| 7,862,051 B2 | * | 1/2011 | Rehm et al. | 279/139 |
| 2003/0164598 A1 | * | 9/2003 | Taglang | 279/139 |

FOREIGN PATENT DOCUMENTS

DE  199 19 408 A1  5/2000

* cited by examiner

*Primary Examiner* — Eric A Gates
(74) *Attorney, Agent, or Firm* — Pandiscio & Pandiscio (57) ABSTRACT

A diaphragm chuck (1) with clamping jaws (3) inserted in its chuck body (2) in a driven connection with a diaphragm (4) that can be deformed by an axially adjustable actuator (5) and is provided with clamping jaws (3) with contact pieces (22), in which counterweights (8) assigned to the clamping jaws (3) are inserted into recesses (7) of the chuck body (2) and the clamping jaws (3) can be clamped against the diaphragm (4) by means of quick-clamping devices (31) engaging in the contact pieces. The contact pieces (22) are each provided with an intermediate element (101) in the area between the clamping jaws (3) and the quick-clamping devices (31) by means of which the flexural moments and/or rotational torques created by the quick-clamping device (31) can be eliminated and it is possible to transmit exclusively axially vectored tensile forces onto the clamping jaws (3). The effect of this embodiment is that the clamping jaws (3) are not unfavorably influenced by the moments created by the quick-clamping devices (31).

14 Claims, 7 Drawing Sheets

DIAPHRAGM CHUCK

The present invention relates to a diaphragm chuck in accordance with the precharacterising clause of claim 1.

A diaphragm chuck of this type is described in European patent application no. 05018464.7. This chuck has proven to be effective in practice. In order to ensure that exact contact with both reference surfaces is achieved at all times, however, it is necessary to manufacture the individual components of the diaphragm chuck to a high level of precision. This requires a great deal of complexity in production, and yet nevertheless flexural and/or tilting moments occurring during tightening of the quick-clamping devices can cause the clamping jaws or clamping heads to lift off the contact surfaces on the diaphragm. This in turn can give rise to inaccuracies during the machining of a workpiece.

The task of the present invention is therefore to improve the operating method of the diaphragm chuck of the aforementioned type by ensuring that the forces that unavoidably arise during clamping of the contact pieces cannot have an unfavourable effect on the clamping jaws or clamping heads. The flexural and/or tilting moments occurring during this process should namely be prevented from acting on the clamping jaws or clamping heads. The construction complexity required in order to achieve this should be kept at a low level, whilst nevertheless a guarantee should be provided that forces of this kind will not be transferred onto the clamping jaws.

In accordance with the present invention, this is achieved in a diaphragm chuck of the type mentioned in the introduction in that the contact pieces of the clamping jaws or clamping heads are each equipped with an intermediate element in the area between these and the quick-clamping devices, by means of which intermediate element the flexural moments and/or rotational torques of the quick-clamping device can be eliminated and it is possible to transmit exclusively axially vectored tensile forces onto the clamping jaws or clamping heads.

In this case, it is advantageous for the intermediate element to be formed by a ball joint arranged in the area of a subdivision of a contact piece.

The ball joint can be formed by a coupling element projecting from one of both parts of the subdivided contact piece, the coupling element being provided with a spherical outer jacket surface in part of its section, and by a recess worked into the other part of the contact piece, the recess having a corresponding contact surface on the inner jacket surface facing the coupling element, in which case the coupling element should be acted on by a compression spring that is supported against the part of the contact piece that engages in the coupling element. Furthermore, it should be possible to rotate the coupling element to a limited extent in the recess of the part of the clamping piece that accommodates the coupling element. A pin inserted in the coupling element can be provided for secure rotation, the pin being supported in a hole in the part of the contact piece that accommodates the coupling element, with provision for play in the circumferential direction.

To facilitate the assembly of the ball joint, it is appropriate for the width of the coupling element and the internal clearance of the recess that accommodates it to be dimensioned so that the coupling element can be inserted into the recess in a position turned through 90° in relation to the operating position, but is securely supported in the recess after being rotated.

To prevent penetration of impurities into the ball joint, the separation point of the contact piece should be sealed by a labyrinth seal formed onto the end surfaces of one part or both parts of the contact piece.

In accordance with a different embodiment, the intermediate element can be formed by a connecting pin that is held in the parts of the contact piece that are arranged at a distance from one another in the area of a subdivision of the contact piece with axial play. The connecting pin in this case can be held on one or both ends by a cross pin inserted in each of the parts of the contact piece, these cross pins engaging in lengthways grooves worked into the connecting pin or directly in the connecting pin itself.

In accordance with another embodiment, the intermediate element can also consist of an elastically deformable zone integrated into the contact piece, in which case this zone can be configured as an intermediate piece in the form of a pin or a plate. The intermediate piece can be manufactured by recesses worked into the contact piece.

In accordance with a different embodiment, the intermediate element can be composed of a threaded rod with one or both ends screwed into threaded holes worked into one or both parts of the contact piece in the area of a subdivision of the contact pieces.

Furthermore, it is advantageous if the contact pieces of the clamping jaws or the clamping heads, or at least the parts of the contact pieces formed directly onto these, to be arranged in the diaphragm and the counterweights with radial play.

If a diaphragm chuck is configured in accordance with the present invention, not only does it offer the benefits associated with the diaphragm chuck of prior art, but it also guarantees that moments caused by the actuation of the quick-clamping devices in order to clamp the contact pieces do not unfavourably influence the clamping jaws or clamping heads. This is because tilting and/or torsion moments are no longer transmitted to the clamping jaws via the intermediate elements configured in different manners, rather they are then exclusively exposed to axially vectored tensile forces. The clamping jaws or clamping heads are therefore not lifted off the reference surfaces and it is therefore guaranteed that a workpiece will be always clamped with a consistent level of precision.

The drawing shows some sample embodiments of a diaphragm chuck configured in accordance with the present invention, the details of which are explained below. In the drawing.

Figure 1:
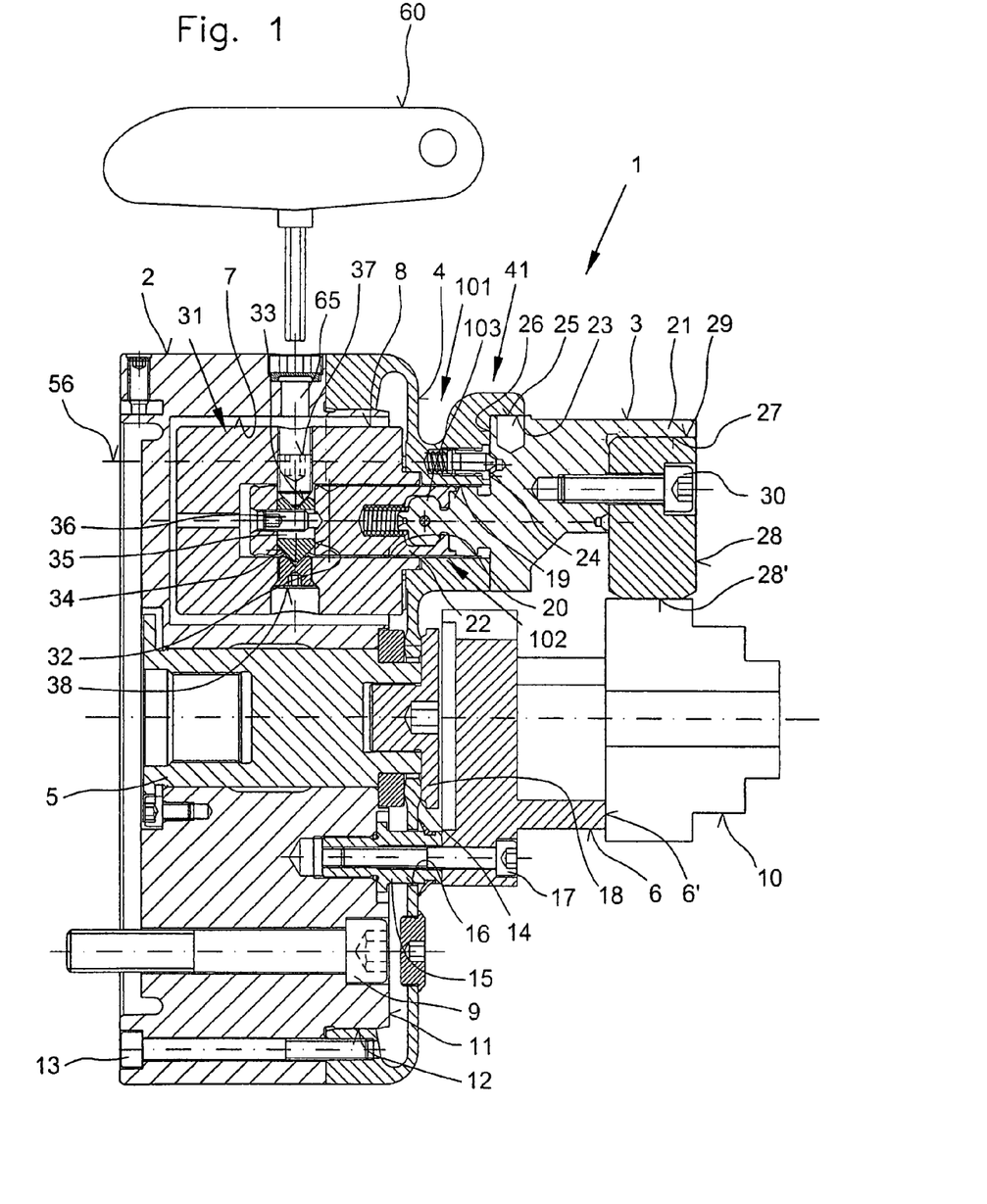
FIG. 1 shows a diaphragm chuck provided with counterweights, with a workpiece clamped in it, as an axial section.

The diaphragm chuck shown in FIG. 1 and identified by 1 is used in particular for clamping high-quality workpieces 10, such as gears, and chiefly consists of clamping jaws 3 inserted in a chuck body 2 acting on the workpiece 10 that are in a driven connection with a deformable diaphragm 4 made from a metallic material that is attached on the front face 11 in a recess 12 in the outer area of the chuck body 2 by means of screws 13.

In order to actuate the diaphragm 4, a centrally arranged actuator 5 is provided into which an adjustable pull rod can be screwed by a servo device (not illustrated) on the end facing away from the clamping jaws 3. On the other end of the actuator 5, the diaphragm 4 provided with a crowned collar 14 is clamped by means of a disc 18.

Furthermore, counterweights 8 are inserted in recesses 7 worked into the chuck body 2 facing the clamping jaws 3 and these counterweights 8 counteract the centrifugal forces generated by the clamping jaws 3 when the diaphragm chuck 1 rotates as well as allowing the clamping jaws 3 to be released using offset contact pieces 22 formed onto the clamping heads 21 of the clamping jaws 3 with the help of quick-clamping devices 31, whilst nevertheless enabling a firm connection to be established. These contact pieces 22, which are for example formed as cylindrical shafts, pass through recesses 19 provided in the diaphragm 4 for this purpose and project into holes 20 worked into the counterweights 8 in which they can be locked by means of the quick-clamping devices 31.

Figure 2:
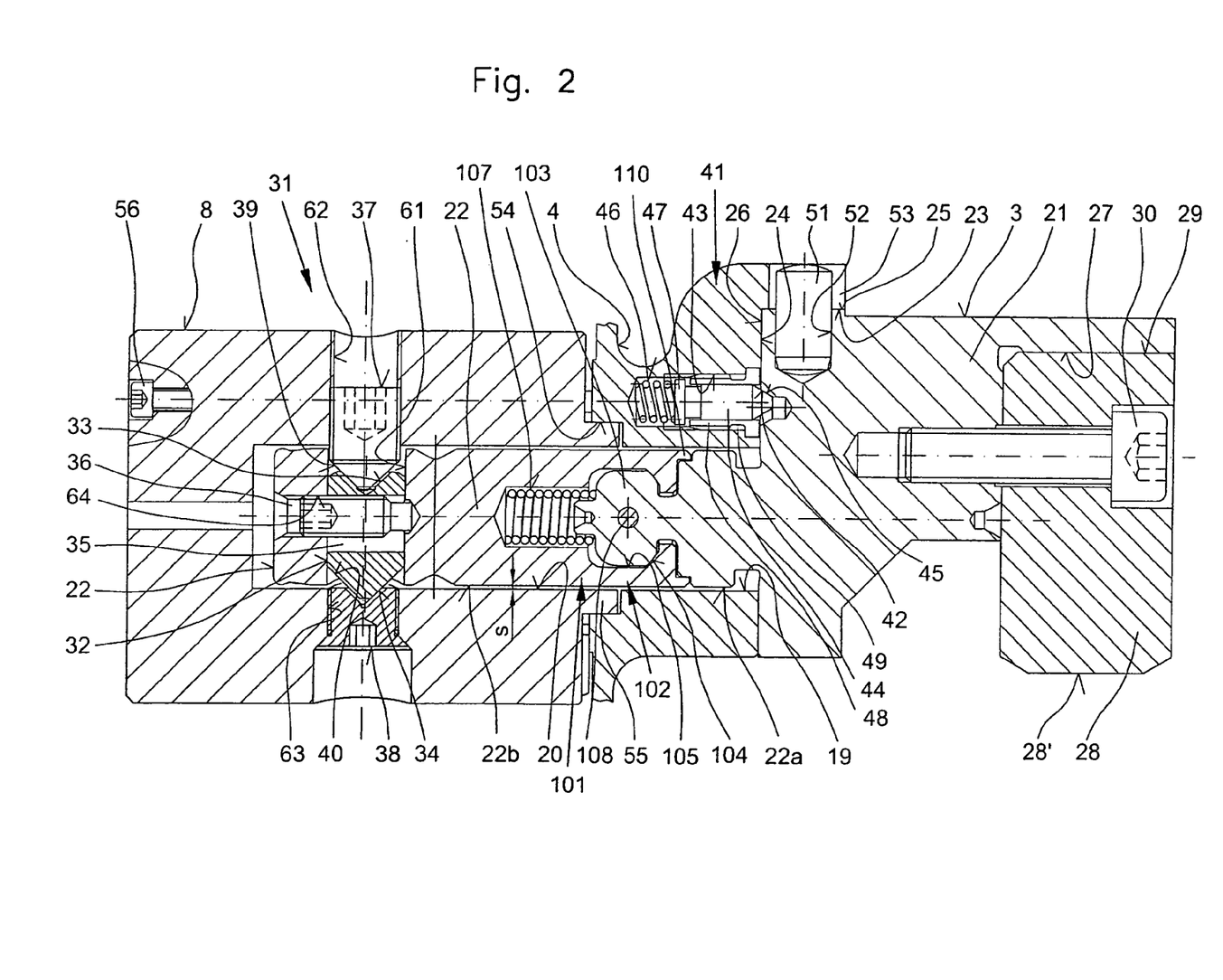
FIG. 2 shows an excerpt from FIG. 1 with a ball joint inserted in a contact piece, in a magnified view.
Figure 3:
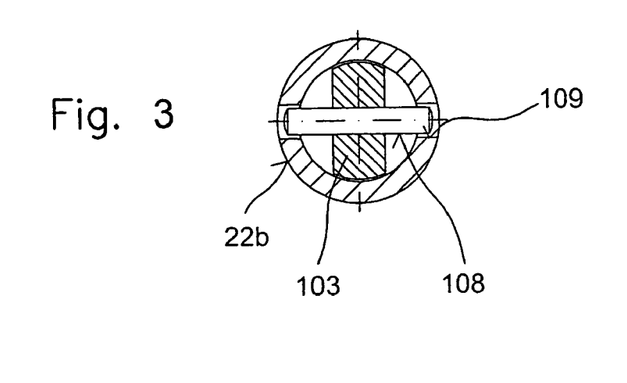
FIG. 3 shows a section through line III-III in FIG. 2.

As is shown in FIG. 2 in particular, each of the quick-clamping devices 31 is formed by a pendulum pin 32 that can be moved in a limited radial arc and by two holding screws 37 and 38 that are installed in an axially offset position in relation to one another in order to generate a force acting in the axial direction of the contact pieces 22. For this purpose, the pendulum pins 32 are inserted in holes 61 worked into the contact pieces 22, whereas the holding screws 37 or 38 are screwed into threaded holes 62 or 63 worked into the counterweights 8. In addition, each of the pendulum pins 32 is provided with an internal cone 33 and an external cone 34 that interact with an external cone 39 or an internal cone 40 worked onto the holding screws 37 or 38. In order for the pendulum pins 32 to be held in the contact pieces 22, threaded holes 64 are worked into the contact pieces 22 and the pendulum pins 32 are provided with slots 35 into which the pins 36 screwed into the threaded holes 64 engage.

The quick-clamping devices 31 operate in such a way that when the holding screws 37 that can be accessed by means of holes 65 aligned with the threaded holes 62 and provided in the chuck body 2 are screwed, for example by means of an Allen key 60, into the internal cone 33 of the pendulum pins 32, the external cones 34 of these pins are braced against the internal cones 40 of the holding screws 38 with the result that the inclined surfaces generate a force acting in the axial direction of the contact pieces 22 and the clamping jaws 3 or their clamping heads 21 are pressed against the diaphragm 4. However, it is a prerequisite that the pendulum pins 32 are slightly axially offset in relation to the holding screws 37 and 38.

In order to support the clamping jaws 3 in the exact position on the diaphragm 4, the diaphragm 4 is provided with a first reference surface 23 and second reference surface 24 that are aligned at right angles to one another and in which the first reference surface 23 runs axially in parallel to the longitudinal axis of the diaphragm chuck 1 when the diaphragm chuck 1 is in its clamping position. In addition, the contact pieces 22 of the clamping heads 21 formed as shafts are arranged in the holes 19 worked into the diaphragm 4 and in the holes 20 provided in the counterweights 8 with a low amount of play "s", with the result that alignment with the first reference surface 23 is possible in a straightforward manner.

Automatic contact of the clamping heads 21 on the first reference surface 23 with a contact surface 25 is achieved by means of spring detents 41, by means of which the clamping heads 21 are pressed outwards and are fixed against this by means of the quick-clamping devices 31. At the same time, contact is made with the contact surface 26 on the reference surface 24 of the diaphragm 4.

In this case, as also shown in the magnified section of FIG. 2, the spring detents 41 consist of a pin 44 inserted in a hole 43 worked into the diaphragm 4 and a compression spring 46 acts on the pin 44, with the tapered tip 45 of the pin 44 engaging in a tapered hole 42 worked into the contact surface 26 of the clamping head 21 opposite to the second reference surface 24. The pin 44 is provided with a collar 47 and is adjustably mounted in a sleeve 48 that is screwed into the hole 43 provided with an internal thread 49. The force of the compression spring 46 therefore presses the clamping head 21 outwards against the first reference surface 23 when the clamping jaws 3 are inserted, and the clamping head 21 is fixed in this position until the clamping jaws 3 are clamped with the diaphragm 4 by means of the quick-clamping devices 31.

In order to provide a positive connection between the counterweights 8 and the diaphragm 4, so that the counterweights 8 follow the movements of the diaphragm 4, the counterweights 8 are firmly screwed onto the diaphragm 4 by means of screws 56. In addition, recesses 54 assigned to the counterweights 8 are worked into the diaphragm 4 and each of the counterweights 8 is provided with a projection 55 that engages in the recesses 54 and is centred in them. The clamping jaws 3 and the counterweights 8 therefore form a single unit in the clamped position.

In order to enable the clamping heads 21 to be aligned easily in the circumferential direction, pins 51 projecting radially outwards are provided on the clamping heads 21 and these pins 51 are inserted into holes 52. Furthermore, the diaphragm 4 is provided with open slots 53 running in the axial direction and the pins 51 are inserted into these slots 53 during mounting of the clamping jaws 3. The position of each of the pins 51 is aligned in relation to the spring detents 41 with the effect that their pins 44 can engage in the holes 42 in a straightforward procedure.

In the embodiment illustrated in FIG. 1, the clamping heads 21 of the clamping jaws 3 do not act directly on the workpiece 10, but instead the clamping heads 21 have reducing jaws 28 with a clamping surface 28' attached to them, in which case the contact surface 29 of the reducing jaws 28 make contact with the contact surfaces 27 of the clamping heads 21 and are attached to them by means of screws 30. This means the reducing jaws 28 can easily be replaced. It goes without saying that it is also possible to configure the clamping heads 21 as one-piece clamping jaws.

In order to support the workpiece 10, there is in addition a three-armed stop ring 6 attached to the chuck body 2, and this ring 6 projects in between the clamping jaws 3 and possesses contact surfaces 6'. In order for the stop ring 6 to be held, sleeves 15 inserted in the chuck body 2 are provided that pass through recesses 16 correspondingly worked into the diaphragm 4. Screws 17 attach the stop ring 6 to the sleeves 15. The front face of the stop ring 6 is formed as a contact surface 6' for the workpiece 10. Additional screws 9 that can be accessed via holes worked into the diaphragm 4 and sealed by plugs secure the chuck body 2 of the diaphragm chuck 1 onto a machine tool.

Consequently, only the reference surfaces 23 and 24 have to be machined to accurate dimensions in the diaphragm chuck 1. The clamping jaws 3 and the reducing jaws 21, in contrast, can be specially produced and provided as selected. The contact surfaces 25 and 27 of the clamping heads 21 and the contact surface 29 of the reducing jaws 28 and their clamping surface 28' always run concentrically in relation to one another when the diaphragm chuck 1 is in its clamped position, which means it is possible to adapt the individual diameters of the contact surfaces to one another and to select the corresponding machining procedure accordingly without the reference surface 23 being influenced and without the need for any grinding in.

Tightening of the quick-clamping device 31 can lead to flexural and/or torsion moments that, amongst other factors, can have a negative effect on the clamping jaws 3 or the clamping heads 21. In particular, moments of this kind can lift them off the first reference surface 23 with the result that it is no longer possible to machine the workpiece 10 exactly.

To present the tilting moments and/or rotational torques being transmitted to the clamping jaws 3 or the clamping heads 21 by the quick-clamping device 31, differently configured intermediate elements 101 (FIGS. 1 to 5), 111 (FIG. 6), 121 (FIG. 7) and 131 (FIG. 8) are inserted in the contact pieces 22 in the area between the quick-clamping devices 31 or 71 and the clamping heads 21, by means of which intermediate elements moments of this kind can be eliminated. This means the intermediate elements 101, 111, 121 and 131 exclusively transmit tensile forces onto the clamping jaws 3 or the clamping heads 21 and this excludes the possibility of lifting off from the first reference surface 23.

In accordance with FIGS. 1 to 5, the intermediate element 101 consists of a ball joint 102 which is formed by subdivision of each of the contact pieces 22, with the part 22a of the contact piece 22 connected to the clamping head 21 having a coupling element 103 with a spherical contact surface 104 formed onto it, and with a recess 106 worked into the opposite part 22b having a correspondingly shaped inner jacket surface 106 assigned to the contact surface 104. The coupling element 103 is acted on by a compression spring 107 that is supported against a part 22b so that it is guaranteed that the surfaces 104 and 106 are always exactly located in relation to one another. A pin 108 held with play in the circumferential direction in holes worked in the part 22b limits the rotation travel of the coupling element 103. In addition, the separation point between both parts 22a and 22b is sealed by a labyrinth seal 110 in order to prevent practically any penetration of impurities into the ball joint 102.

Figure 4:
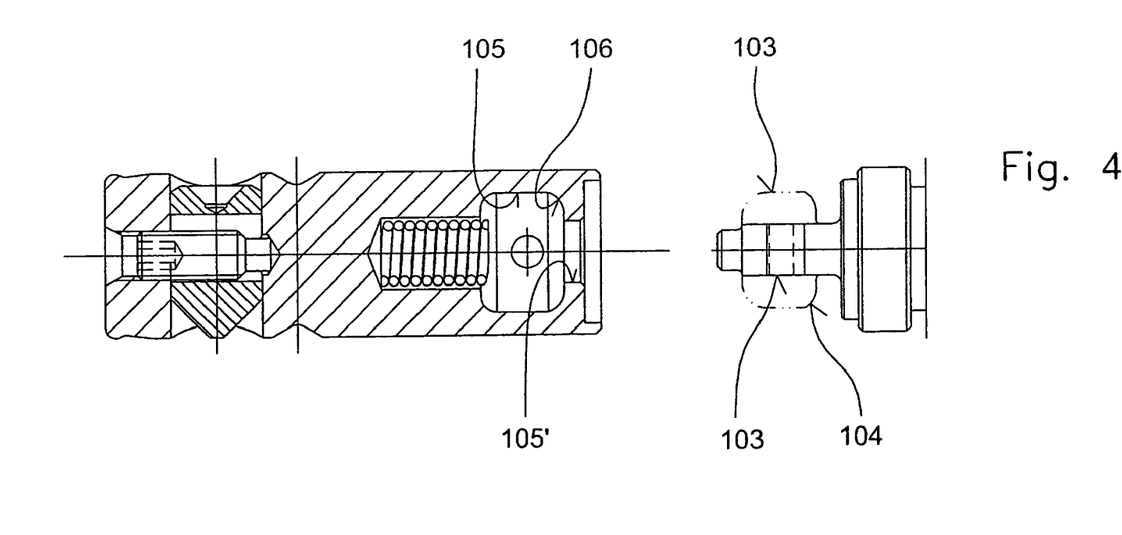
FIG. 4 shows the two parts of the contact piece from FIG. 2 that are to be locked one inside the other, in an exploded view.

In order to be able to guide the coupling element 103 into the recess 105 and to lock it there, the coupling element is configured with a flattened side as shown in FIG. 4 and its width is reduced so as to be smaller than the clearance of the entrance area 105' of the recess 105. Following insertion of the coupling element 103 into the position in the recess 105 shown in FIG. 4, it is turned through 90° into the operating position shown in FIGS. 1 and 2 so that the coupling element 103 is locked in the recess 105. FIG. 4 indicates the height of the coupling element 103 with a dashed/dotted line.

Figure 5:
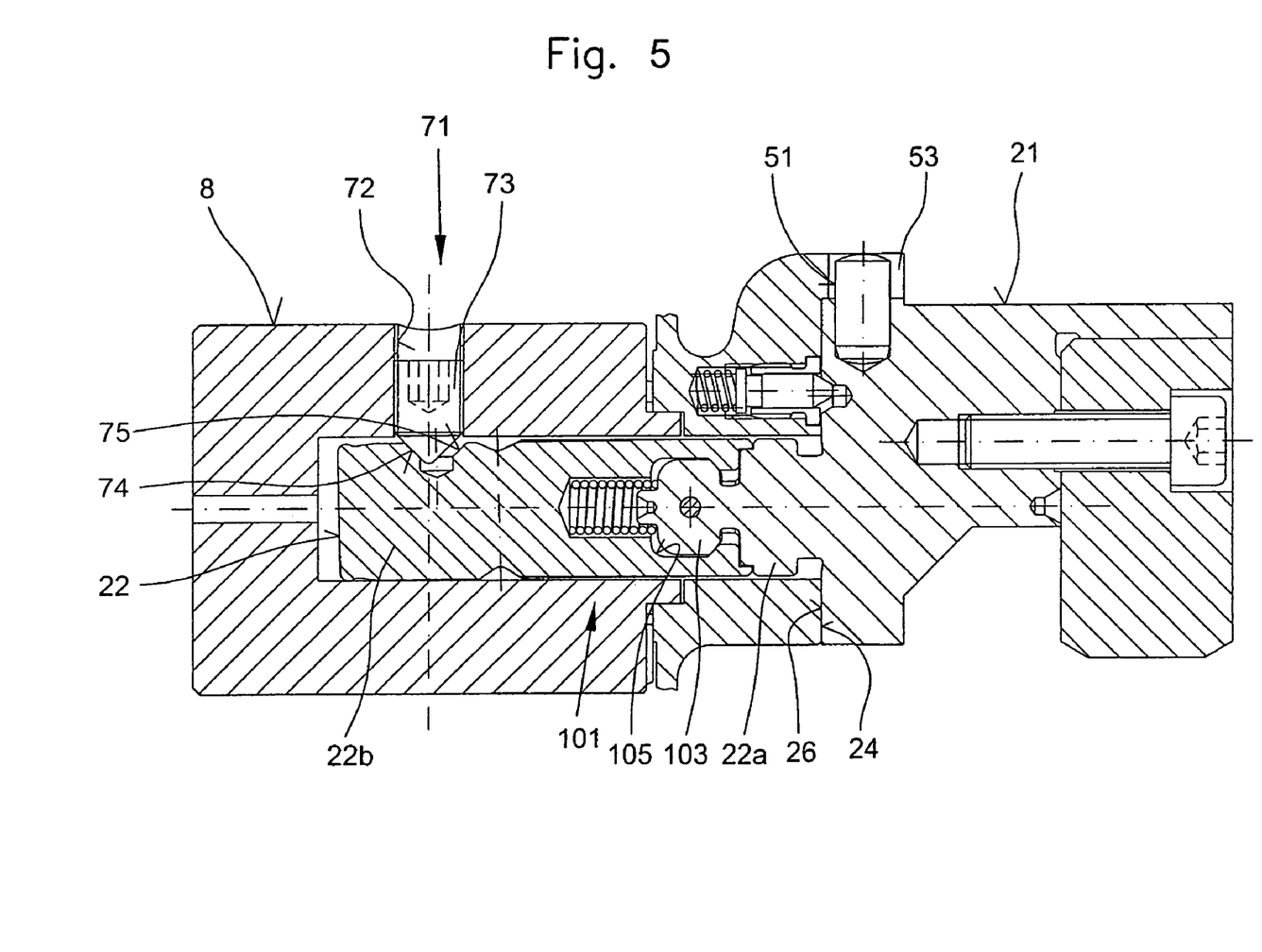
FIG. 5 shows an excerpt in accordance with FIG. 2, with a quick-clamping device having a different embodiment

As shown in FIG. 5, each quick-clamping device 71 can also be provided as a clamping screw 73 screwed into a threaded hole 72 worked into the counterweights 8 and engaging in a spherical hole 75 worked into the part 22b of the contact piece 22 with a spherically shaped tip 74. The part 22b that is pressed against the counterweight 8 by the clamping screw 73 is pushed to the left with the spherical hole 75 due to this effect and also because of the tip 74 of the clamping screw 73 with which it interacts. The tensile force this creates is transferred to the part 22a of the clamping head 21 so that this clamping head 21 is pressed against the two reference surfaces 23 and 24, while the inclined position of the part 22b is compensated by the intermediate element 101 because a rotational movement is performed in the ball joint 102.

Figure 6:
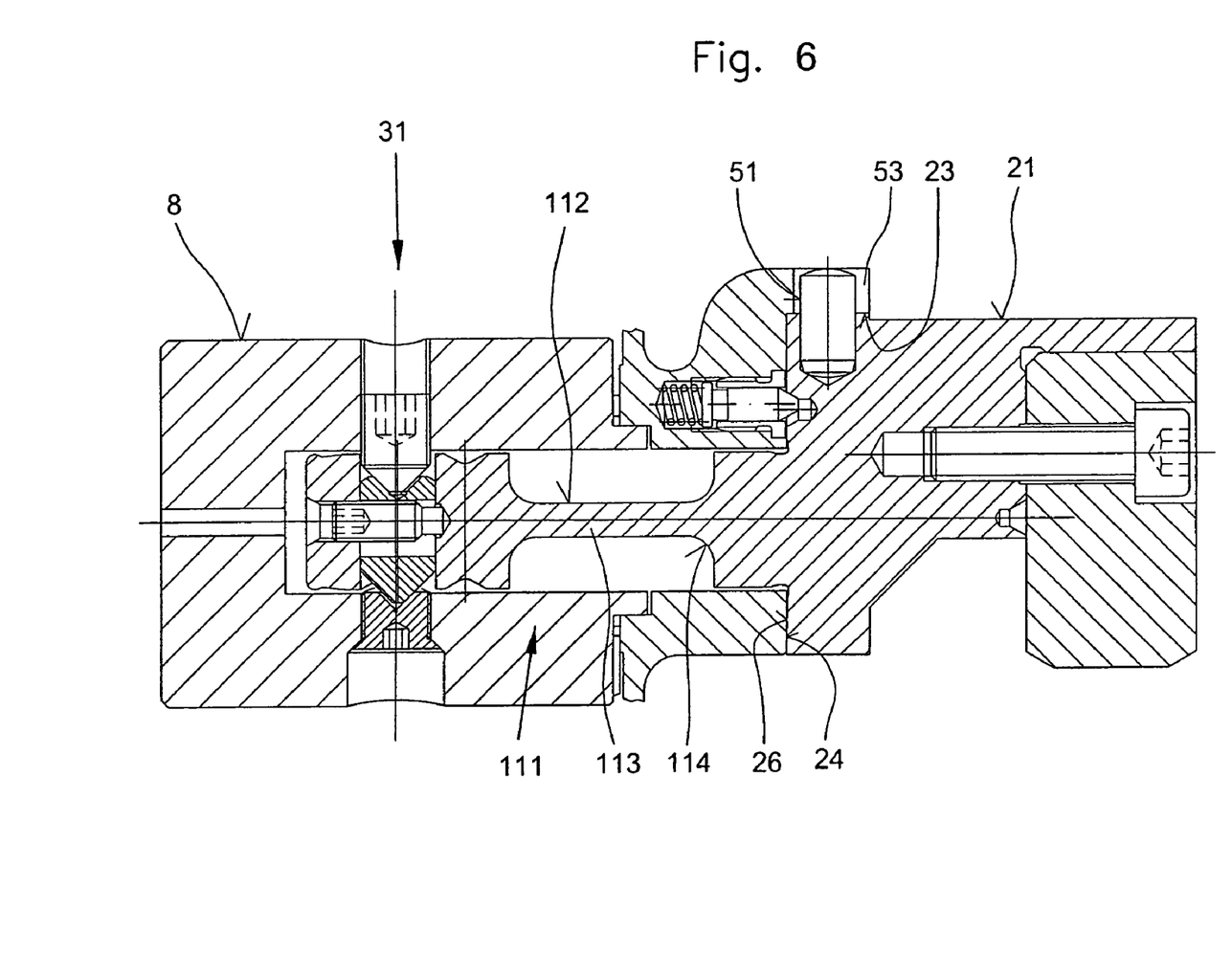
FIG. 6 shows a contact piece provided with an elastic zone as its intermediate element, in a representation in accordance with FIG. 2 and FIGS. 7 and 8 each show a subdivided contact piece with intermediate elements having different embodiments, in representations in accordance with FIG. 2.

In the embodiment shown in FIG. 6, the intermediate element 111 is formed by an elastically deformable zone 112 provided in the contact piece 22 in the area between the clamping head 21 and the quick-clamping device 31. In this case, contact piece 22 has a circumferential recess 114 worked into it, leaving an intermediate piece 113 in the form of a pin or a plate permitting the contact piece 22 to deform. The tilting moments and/or rotational torques created by the quick-clamping device 31 are therefore not transmitted to the clamping head 21 either.

Figure 7:
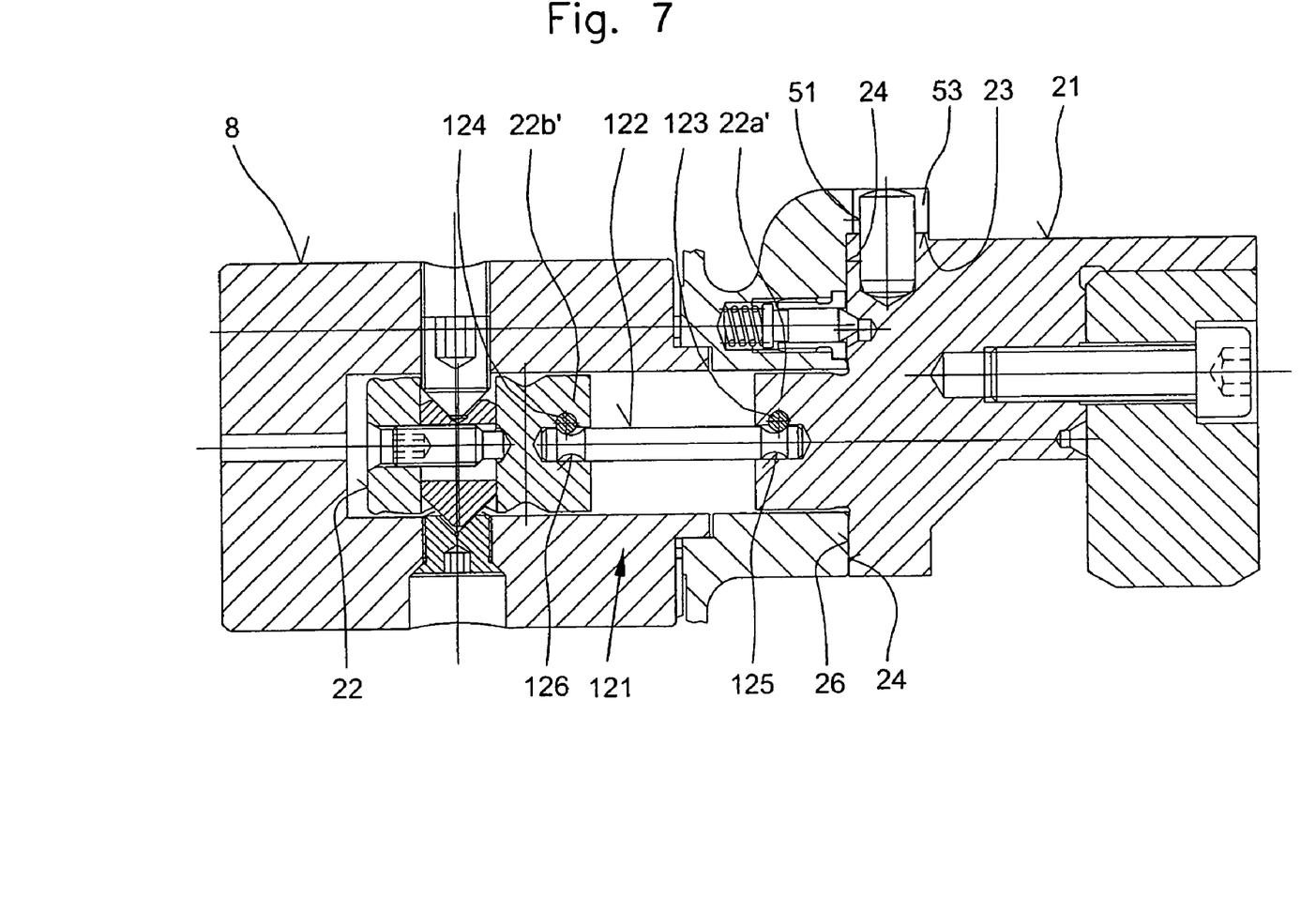

In accordance with FIG. 7, the intermediate element 121 consists of a connecting pin 122 inserted in both parts 22a' and 22b' of the contact piece 22 that are created by a subdivision and are arranged with a lateral clearance from one another. Cross pins 123 and 123 that engage in lengthways grooves 125 or 126 worked into the connecting pin 122 mean that the connecting pin 122 is held in a rotating arrangement. The moments created by the quick-clamping device 31 are therefore absorbed by the connecting pin 122 and the contact between the clamping head 21 and the reference surfaces 23 and 24 is not impaired by moments of this kind.

Figure 8:
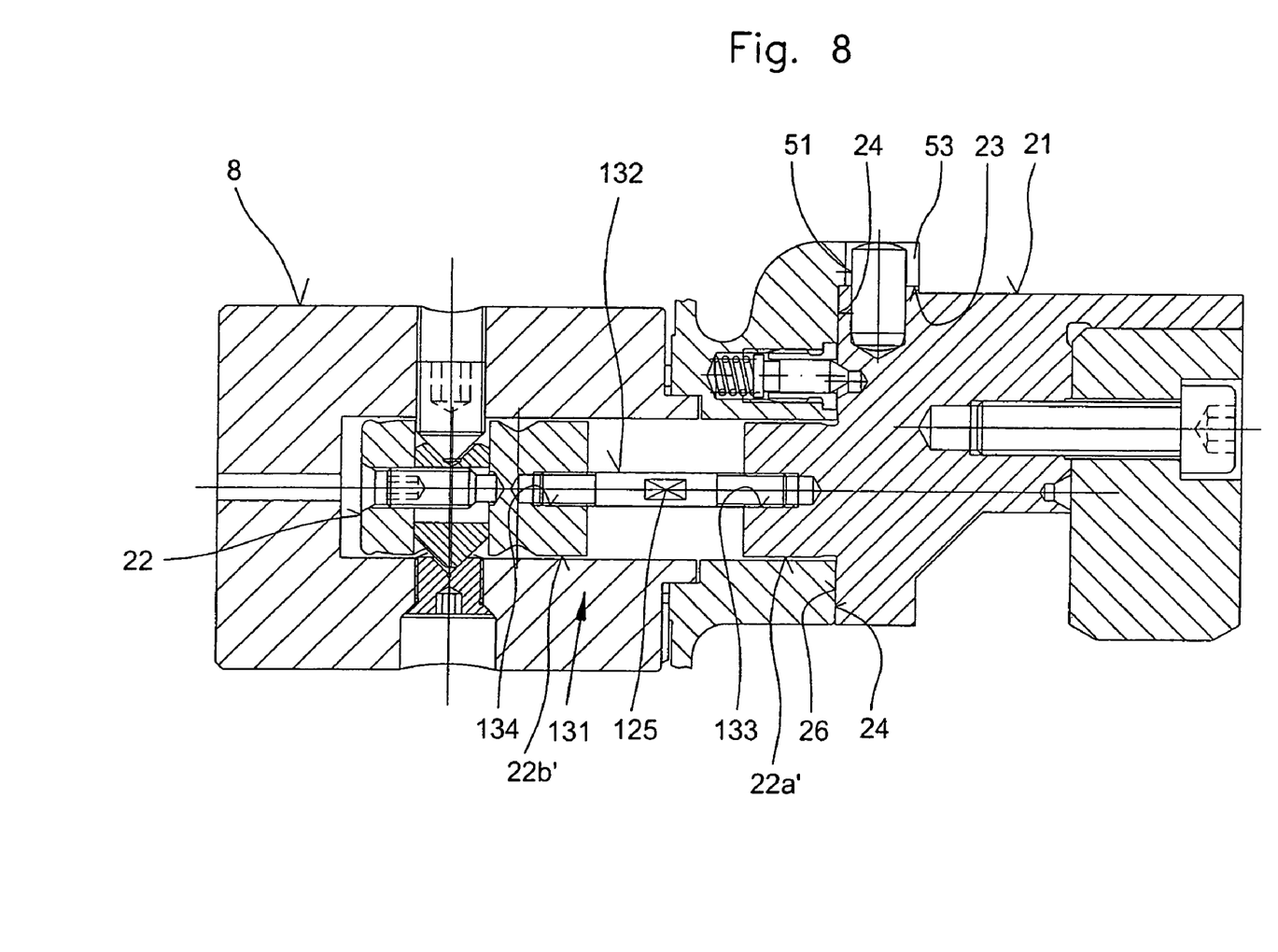

In the embodiment shown in FIG. 8, the function of intermediate element 131 is performed by a threaded pin 132 that has its ends screwed into threaded holes 133 and 134 in both parts 22a' and 22b' of the contact piece 22 that are arranged with a lateral distance between one another.

The threaded holes 133 and/or 133 make it possible for the threaded pin 132 to twist, therefore the moments created by the quick-clamping device 31 are not transferred to the part 22a' of the contact piece 22 and, consequently, not to the clamping heads 21 either.

Nevertheless, a high level of clamping accuracy is always provided when different workpieces are clamped.

The invention claimed is:

1. A diaphragm chuck (1) comprising clamping jaws (3) connected to a chuck body (2) and adapted to act on a workpiece (10) to be clamped, said jaws being in a driven connection with a diaphragm (4) that is located on a front face (11) of the chuck body (2), and being attached to an outer area of the chuck body (2) and deformable by means of a centrally arranged, axially adjustable actuator (5), the chuck further comprising counterweights (8) assigned to said clamping jaws (3) and located in recesses (7) in the chuck body (2), each of said clamping jaws (3) being designed as clamping heads (21) each equipped with an offset contact piece (22) axially arranged in the direction of the chuck body (2) and extending generally axially in parallel to the chuck body (2), the contact pieces (22) being held in recesses (20) in said counterweights (8) and said clamping jaws (3) being clamped against the diaphragm (4) and said counterweights (8) by means of quick-clamping devices (31, 71) that engage in the contact pieces (22) and act in an axial direction of the contact pieces (22), at least one of said clamping jaws (3) and the clamping heads (21) being directly supported against a first reference surface (23) running axially in parallel to the chuck body (2) in the clamping position, and against a second reference surface (24) of the diaphragm (4) at right angles to the first reference surface (23), wherein the contact pieces (22) of said clamping jaws (3) and the clamping heads (21) are each equipped with an intermediate element (101; 111; 121; 131) in an area between said jaws (3) and the heads (21) on one hand and the quick-clamping devices (31, 71) on the other hand, by means of which intermediate element (101; 111; 121; 131) flexural moments and rotational torques of the quick-clamping devices (31, 71) are eliminated and exclusively axially vectored tensile forces are transmitted onto the selected one of said clamping jaws (3) and the clamping heads (21).

2. The diaphragm chuck in accordance with claim 1, wherein
the intermediate element (101) is formed by a ball joint (102) arranged in an area of a subdivision of at least one of the contact pieces (22).

3. The diaphragm chuck in accordance with claim 2, wherein
the ball joint (102) is formed by a coupling element (103) projecting from at least one of the contact pieces (22*a*) of the subdivided contact piece (22), the coupling element (103) being provided with a spherical outer jacket surface (104), and with a recess (105) in another part (22*b*) of the contact piece (22), the recess (105) having a corresponding contact surface (106) on the inner jacket surface facing the coupling element (103).

4. The diaphragm chuck in accordance with claim 3, wherein
the coupling element (103) is acted on by a compression spring (107) that is supported against the part (22*b*) of the contact piece (22) that engages in the coupling element (103).

5. The diaphragm chuck in accordance with claim 3, wherein
the coupling element (103) can rotate to a limited extent in the recess (105) of the part (22*b*) of the clamping piece (22) that accommodates the coupling element (103).

6. The diaphragm chuck in accordance with claim 5, wherein
a pin (108) is disposed in the coupling element (103) to provided for secure rotation, the pin (108) being supported in a hole (109) in the part (22*b*) of the contact piece (22) that accommodates said coupling element (103), with provision for play in a circumferential direction.

7. The diaphragm chuck in accordance with claim 3, wherein
the width of the coupling element (103) and the internal clearance of the recess (105, 105') are dimensioned so that the coupling element (103) can be inserted into the recess (105, 105') in a position turned through 90° in relation to an operating position.

8. The diaphragm chuck in accordance with claim 7, wherein
a separation point of the contact piece (22) is sealed by a labyrinth seal (110) formed onto the end surfaces of at least one part (22*b*) of the contact piece (22).

9. The diaphragm chuck in accordance with claim 1, wherein
each intermediate element (111) comprises an elastically deformable zone (112) integrated into the contact piece (22).

10. The diaphragm chuck in accordance with claim 9, wherein
each elastically deformable zone (112) comprises an intermediate piece (113) in the form of a selected one of a pin and a plate, and said zones (112) are formed by recesses in the contact pieces (22).

11. The diaphragm chuck in accordance with claim 1, wherein
the intermediate element (121) comprises a connecting pin (122) positioned in the parts (22*a'*, 22*b'*) of the contact piece (22) and arranged at a distance from one another in the area of a subdivision of the contact piece (22) and held in at least one part of the contact piece (22) with axial play.

12. The diaphragm chuck in accordance with claim 11, wherein
said connecting pin is held on at least one end by a cross pin (113, 114) inserted in each of the parts of the contact piece, the cross pins (113, 114) engaging in one of lengthwise grooves (115, 116) in said connecting pin and directly in said connecting pin with axial play.

13. The diaphragm chuck in accordance with claim 1, wherein
the intermediate element (131) comprises a threaded rod (132) with at least one end screwed into a threaded hole (113, 114) in a part of the contact piece (22) in an area of a subdivision of the contact piece.

14. The diaphragm chuck in accordance with claim 13, wherein the contact pieces (22) of said clamping jaws and the clamping heads (21), and at least the parts (22*a'*) of the contact pieces (22) formed directly onto these same, are arranged in the diaphragm (4) and said counterweights (8) with radial play.

\* \* \* \* \*